United States Patent
Schmid et al.

(10) Patent No.: US 7,332,466 B2
(45) Date of Patent: Feb. 19, 2008

(54) LIGHTLY-FOAMING TENSIDE MIXTURES WITH HYDROXY MIXED ETHERS

(75) Inventors: Karl-Heinz Schmid, Mettmann (DE); Rita Koester, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 426 days.

(21) Appl. No.: 10/991,261

(22) Filed: Nov. 17, 2004

(65) Prior Publication Data

US 2005/0130865 A1   Jun. 16, 2005

Related U.S. Application Data

(63) Continuation of application No. 09/486,920, filed as application No. PCT/EP98/05464 on Aug. 28, 1998, now abandoned.

(30) Foreign Application Priority Data

Sep. 5, 1997    (DE) ................. 197 38 866

(51) Int. Cl.
  *C11D 1/22*    (2006.01)
  *C11D 1/722*   (2006.01)
  *C11D 3/20*    (2006.01)

(52) U.S. Cl. ............ 510/421; 510/221; 510/229; 510/413; 510/475; 510/506; 510/514; 510/524; 510/535

(58) Field of Classification Search ............ 510/221, 510/229, 413, 421, 475, 506, 514, 524, 535
See application file for complete search history.

(56) References Cited

U.S. PATENT DOCUMENTS

| | | | |
|---|---|---|---|
| 4,624,803 A | 11/1986 | Balzer et al. | |
| 4,898,621 A | 2/1990 | Pruehs et al. | |
| 4,925,587 A | 5/1990 | Schenker et al. | |
| 5,205,959 A | 4/1993 | Schmid et al. | |
| 5,294,365 A | 3/1994 | Welch et al. | |
| 5,759,987 A | 6/1998 | Haerer et al. | |
| 5,967,157 A * | 10/1999 | Chatterjee et al. | 134/25.2 |
| 6,732,748 B2 * | 5/2004 | Kahre et al. | 134/25.2 |

FOREIGN PATENT DOCUMENTS

| | | |
|---|---|---|
| DE | 37 23 323 | 1/1989 |
| DE | 37 23 873 | 1/1989 |
| DE | 39 28 600 | 3/1991 |
| DE | 39 28 602 | 3/1991 |
| DE | 43 23 252 | 1/1995 |
| EP | 0 161 537 | 11/1985 |
| EP | 0 343 503 | 11/1989 |
| WO | WO 94/22800 | 10/1994 |
| WO | WO 96/12001 | 4/1996 |

* cited by examiner

*Primary Examiner*—Brian Mruk
(74) *Attorney, Agent, or Firm*—John F. Daniels; Daniel S. Ortiz

(57) ABSTRACT

A low-foaming surfactant composition comprising: (a) a hydroxy mixed ether corresponding to formula I:

$$R^1O[CH_2CH(CH_3)O]_x(CH_2CHR^2O)_y[CH_2CH(OH)R^3]_z \quad (I)$$

wherein $R^1$ is an alkyl and/or alkylene group containing from 4 to 18 carbon atoms, $R^2$ is hydrogen, $R^3$ is an alkyl group having from 2 to 22 carbon atoms, x is 0, y is a number from 1 to 30, and z is a number from 1 to 3; and (b) a low-foaming nonionic surfactant selected from the group consisting of an optionally end-capped fatty alcohol polyethylene glycol/polypropylene glycol ether corresponding to formula II:

$$R^4O(CH_2CH_2O)_n[CH_2(CH_3)CHO]_mR^5 \quad (II)$$

wherein $R^4$ is an alkyl and/or alkylene group containing from 8 to 22 carbon atoms, $R^5$ is hydrogen or an alkyl group containing from 1 to 8 carbon atoms, n is a number from 1 to 15 and m is a number up to 10, an optionally end-capped fatty alcohol polypropylene glycol/polyethylene glycol ether corresponding to formula II:

$$R^6O[CH_2(CH_3)CHO]_p(CH_2CH_2O)_qR^7 \quad (III)$$

wherein $R^6$ is an alkyl and/or alkylene group having from 8 to 22 carbon atoms, $R^7$ is hydrogen or an alkyl group having from 1 to 8 carbon atoms, p is a number from 1 to 5, and q is a number up to 15, and mixtures thereof.

8 Claims, No Drawings

LIGHTLY-FOAMING TENSIDE MIXTURES WITH HYDROXY MIXED ETHERS

RELATED APPLICATIONS

This application is a continuation of Ser. No. 09/486,920 filed May 24, 2000, now abandoned, claiming priority from international application PCT/EP98/05464 filed Aug. 28, 1998, claiming priority from German Application No. DE 197 38 866.3 filed Sep. 5, 1997, the entire contents of each application is incorporated herein by reference.

BACKGROUND OF THE INVENTION

This invention relates to low-foaming surfactant mixtures containing hydroxy mixed ethers and special other low-foaming nonionic surfactants and to the use of these low-foaming mixtures as surfactants in industrial and domestic cleaning compositions. The present invention also relates to the use of the low-foaming mixtures in rinse aids, more particularly for dishwashing machines, and to rinse aids containing the hydroxy mixed ethers.

For surfactants which are intended for use in institutional and industrial cleaning compositions, it is crucially important that they generate little foam under the particular in-use conditions in order to guarantee a trouble-free cleaning process. However, domestic cleaning compositions, for example wax-containing high-shine floor cleaners, should also generate little foam so that no unattractive wax bubbles are left behind after drying.

In many cases, however, surfactants are not only expected to have little or no tendency to foam, they are also expected to show additional properties, such as good wetting properties, alkali stability and favorable rinse-off behavior. For washing bottles in the beverage industry, for example, the surfactants are also expected to be stable under highly alkaline conditions, i.e. they should not form any foaming degradation products. In addition, in industrial cleaning processes in the metal industry, they are also expected to show very good wetting properties so that drawing and rolling oils can be satisfactorily removed. Favorable rinse-off behavior is an important factor, for example, in the spray cleaning of cars where, after the actual washing process, the surfactants have to be completely rinsed off together with the soil with only a little water in a very short time. In addition, the water is intended to drain from the bodywork in the form of a thin coherent film so that no water droplets, streaks or films are left behind during the following brief drying process.

In machine dishwashing, too, the special rinse aids used in the so-called clear-rinse cycle are expected to show good wetting properties so that the surface tension of the rinsing water used can be reduced to such an extent that it drains like a film from the tableware and, after drying, does not leave behind any visible residues, such as lime stains. In addition, the rinse aids are expected to be low-foaming in view of the vigorous movement of the wash liquor in dishwashing machines.

DE-A1 37 23 873 discloses hydroxy mixed ethers which may be used either on their own or in combination with fatty alcohol alkoxylates in rinse aids for machine dishwashing. These hydroxy mixed ethers are prepared by reacting $C_{10-18}$ epoxides and alcohol ethoxylates ethoxylated with 7 to 30 moles ethylene oxide.

DE-A1 37 23 323 also discloses hydroxy mixed ethers which may be obtained by reacting $C_{8-18}$ epoxides and alcohol alkoxylates alkoxylated with up to 30 moles ethylene oxide and/or propylene oxide. According to this document, the hydroxy mixed ethers may be used on their own as foam-suppressing additives in low-foaming cleaning compositions.

Finally, International patent application WO 96/12001 discloses hydroxy mixed ethers which are obtained by reacting $C_{4-16}$ epoxides with alcohol alkoxylates, the alcohols being derived from monohydric to trihydric alcohols which have been alkoxylated with 0 to 5 mole propylene oxide and 1 to 30 mole ethylene oxide or only with 1 to 35 mole propylene oxide. These hydroxy mixed ethers may be used as a surfactant mixture for the cleaning of hard surfaces, more particularly tableware, or in the form of liquid blends as rinse aids.

The problem addressed by the present invention was to provide surfactant mixtures for cleaning various surfaces, such as glass, tableware, metal surfaces, plastics, stone floors and painted metal surfaces. The surfactant mixtures would have little tendency to foam, but at the same time would show favorable rinse-off behavior and an improved clear drying effect so that they would not leave any troublesome visible stains behind on the cleaned surface. Finally, the surfactant mixtures would have good low-temperature behavior so that no troublesome phase separation would occur either at the occasionally high in-use temperatures or at the occasionally low storage temperatures.

The complex problem stated above has been solved by mixtures containing hydroxy mixed ethers and other special low-foaming nonionic surfactants.

BRIEF SUMMARY OF THE INVENTION

Accordingly, the present invention relates to low-foaming surfactant mixtures containing a. hydroxy mixed ethers corresponding to formula (I):

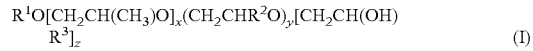
$$R^1O[CH_2CH(CH_3)O]_x(CH_2CHR^2O)_y[CH_2CH(OH)R^3]_z \qquad (I)$$

in which
$R^1$ is an alkyl and/or alkylene group containing 4 to 18 carbon atoms,
$R^2$ is hydrogen or a methyl or ethyl group,
$R^3$ is an alkyl group containing 2 to 22 carbon atoms,
x is 0 or a number of 1 to 10,
y is a number of 1 to 30 and
z is the number 1, 2 or 3, and b. low-foaming nonionic surfactants from the group consisting of
b1) optionally end-capped fatty alcohol polyethylene glycol/polypropylene glycol ethers corresponding to formula (II):

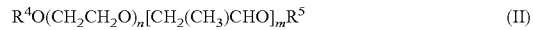
$$R^4O(CH_2CH_2O)_n[CH_2(CH_3)CHO]_mR^5 \qquad (II)$$

in which
$R^4$ is an alkyl and/or alkylene group containing 8 to 22 carbon atoms,
$R^5$ is hydrogen or an alkyl group containing 1 to 8 carbon atoms
n is a number of 1 to 15 and
m is 0 or a number of 1 to 10, and
b2) optionally end-capped fatty alcohol polypropylene glycol/polyethylene glycol ethers corresponding to formula (III):

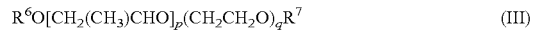
$$R^6O[CH_2(CH_3)CHO]_p(CH_2CH_2O)_qR^7 \qquad (III)$$

in which $R^6$ is an alkyl and/or alkylene group containing 8 to 22 carbon atoms, $R^7$ is hydrogen or an alkyl group containing 1 to 8 carbon atoms, p is a number of 1 to 5 and q is a number of 0 to 15.

DETAILED DESCRIPTION OF THE INVENTION

Hydroxy mixed ethers corresponding to formula (I) are known from the literature and are described, for example, in above-cited International patent application WO 96/12001. They are prepared by reacting 1,2-epoxy alkanes ($R^3CHOCH_2$), where $R^3$ is an aliphatic saturated, linear or branched alkyl chain containing 2 to 22 carbon atoms, with monohydric, dihydric and/or trihydric alcohols which have been alkoxylated. According to the invention, hydroxy mixed ethers derived from alkoxylates of monohydric alcohols (z=1) with the formula $R^1$—OH, where $R^1$ is an aliphatic, saturated, linear or branched alkyl chain containing 4 to 18 carbon atoms, are preferred. Examples of such straight-chain alcohols are the so-called fatty alcohols, such as caproic, caprylic, lauryl, myristyl and stearyl alcohol and the technical mixtures thereof obtained in the high-pressure hydrogenation of technical methyl esters based on fats and oils. Examples of these branched-chain alcohols are so-called oxo alcohols which generally contain 2 to 4 methyl groups as branches and which are produced by the oxo process and so-called Guerbet alcohols branched in the 2-position by an alkyl group. Suitable Guerbet alcohols are 2-ethyl hexanol, 2-butyl octanol, 2-hexyl decanol and/or 2-octyl dodecanol.

The alcohols are used in the form of their alkoxylates which are prepared in known manner by reacting the alcohols with ethylene oxide, propylene oxide and/or butylene oxide. Alkoxylates of alcohols which have been alkoxylated with 10 to 25 moles ethylene oxide ($R^2$=hydrogen, x=0, y=10 to 25) or with 1 to 3 moles propylene oxide and then with 10 to 25 moles ethylene oxide ($R^2$=hydrogen, x=1 to 3, y=10 to 25) are preferably used.

Most particularly suitable hydroxy mixed ethers corresponding to formula (I) are those in which $R^1$ is a saturated, linear alkyl chain containing 8 to 14 carbon atoms, $R^2$ is hydrogen, $R^3$ is a saturated linear alkyl chain containing 8 to 12 carbon atoms, x is 0 or a number of 1 to 3, y is a number of 10 to 25 and z is the number 1. Hydroxy mixed ethers such as these are described in detail in DE-A1 27 23 323.

The surfactant mixtures contain low-foaming nonionic surfactants corresponding to formula (II) and/or (III) as another compulsory component. In one embodiment, they contain fatty alcohol polyethylene glycol/polypropylene glycol ethers of formula (II) which are optionally end-capped. Fatty alcohol polyethylene glycol/polypropylene glycol ethers which are not end-capped ($R^5$=H) are described, for example, in European patent application EP-A2 0 161 537 and in DE-A1 39 28 602 and DE-A1 39 28 600. Particularly suitable non-end-capped representatives are those corresponding to formula (II), in which $R^4$ is an aliphatic, saturated, linear or branched alkyl chain containing 8 to 16 carbon atoms, n is a number of 1 to 5, m is 0 and $R^5$ is hydrogen. These compounds are products of the addition of 1 to 5 moles ethylene oxide onto monohydric alcohols. Suitable alcohols are the alcohols described above, such as fatty alcohols, oxo alcohols and Guerbet alcohols. Of these alcohol ethoxylates, so-called narrow range types are particularly suitable. Other suitable representatives of non-end-capped representatives are those corresponding to formula (II), in which $R^4$ is an aliphatic, saturated, linear or branched alkyl chain containing 8 to 16 carbon atoms, n is a number of 2 to 7, m is a number of 3 to 7 and $R^5$ is hydrogen. These representatives are products of the addition of, first, 2 to 7 moles ethylene oxide and then 3 to 7 moles propylene oxide onto alkoxylated monohydric alcohols of the type already described.

The end-capped compounds corresponding to formula (II) are capped by a $C_{1-8}$ alkyl group ($R^5$). Compounds such as these are often referred to in the literature as mixed ethers. Suitable representatives are methyl-end-capped compounds corresponding to formula (II), in which $R^4$ is an aliphatic, saturated, linear or branched alkyl chain containing 8 to 16 carbon atoms, n is a number of 2 to 7, m is a number of 3 to 7 and $R^5$ is a methyl group. Compounds such as these may readily be obtained by reacting the corresponding non-end-capped fatty alcohol polyethylene glycol/polypropylene glycol ethers with methyl chloride in the presence of a base.

Suitable representatives of alkyl-end-capped compounds are those corresponding to formula (II), in which $R^4$ is an aliphatic, saturated, linear or branched alkyl group containing 8 to 16 carbon atoms, n is a number of 5 to 15, m is 0 and $R^5$ is an alkyl group containing 4 to 8 carbon atoms. End capping is preferably carried out with a linear or branched butyl group by reacting the corresponding fatty alcohol polyethylene glycol ether with n-butyl chloride or with tert.butyl chloride in the presence of bases.

Optionally end-capped fatty alcohol polypropylene glycol/polyethylene glycol ethers corresponding to formula (III) may be present together with the hydroxy mixed ethers either instead of or in combination with the compounds corresponding to formula (II). Compounds such as these are described, for example, in DE-A1 43 23 252. Particularly preferred representatives of the compounds corresponding to formula (III) are those in which $R^6$ is an aliphatic, saturated, linear or branched alkyl chain containing 8 to 16 carbon atoms, p is a number of 1 to 5, q is a number of 1 to 6 and $R^7$ is hydrogen. These compounds are preferably products of the addition of 1 to 5 moles propylene oxide and 1 to 6 moles ethylene oxide onto monohydric alcohols which have already been described as suitable in connection with the hydroxy mixed ethers.

The low-foaming surfactant mixtures may contain components a) and b) in a ratio by weight of 10:90 to 80:20, preferably in a ratio by weight of 30:70 to 70:30 and more preferably in a ratio by weight of 30:70 to 40:60. The components b) may either be exclusively those of b1) or exclusively those of b2) or mixtures of b1) and b2), the ratio of component b1) to component b2) being variable within wide ranges. If mixtures of b1) and b2) are used, they may be present in a ratio by weight of 10:90 to 90:10.

The present invention also relates to the use of the described surfactant mixtures in industrial and domestic cleaning compositions. According to the present invention, the described surfactant mixtures are preferably used as low-foaming surfactant mixtures for institutional laundries, for cleaning metal surfaces in the metal industry, for washing glass bottles in the beverage industry, for the spray cleaning of cars, for floor cleaners, above all those containing waxes, and in the cleaning of buildings. The described surfactant mixtures may also be used as an effective wetting agent in the pretreatment of textiles.

The present invention also relates to the use of the described mixtures in rinse aids for domestic and institutional dishwashing machines.

The present invention also relates to rinse aids, more particularly for domestic and institutional dishwashing machines, containing 0.5 to 20% by weight of the hydroxy mixed ethers corresponding to formula (I),
0.5 to 20% by weight of low-foaming surfactants corresponding to formula (II) and/or (III),
0 to 40% by weight of solubilizers,
0.1 to 50% by weight of carboxylic acids,
1 to 20% by weight of alkali metal salts of low molecular weight alkyl benzene sulfonic acids,
water to 100% by weight.

Suitable carboxylic acids are the carboxylic acids known as complexing agents, such as citric acid, tartaric acid and/or glycolic acid. A particularly suitable alkali metal salt of low molecular weight alkyl benzene-sulfonic acid is sodium cumene sulfonate. Typical solubilizers are monohydric and polyhydric alcohols. Other typical ingredients may optionally be present in the usual quantities, including dyes, perfumes and preservatives, the quantity in which these typical ingredients are used reducing the amount of water added.

EXAMPLES

I. Surfactants Used
A) Hydroxy mixed ethers corresponding to formula (I)
  A1) $C_{8/10}$ fatty alcohol+2PO+20EO $CH_2CH(OH)C_8H_{17}$
  A2) i-$C_8$-oxo alcohol+25EO $CH_2CH(OH)C_{10}H_{21}$
B) End-capped fatty alcohol polyethylene glycol ethers corresponding to formula (II)
  B1) $C_{12/14}$ coconut alcohol+5EO butyl ether
  B2) $C_{12/14}$ coconut alcohol+10EO butyl ether
C) Fatty alcohol polypropylene glycol/polyethylene glycol ethers corresponding to formula (III)
  C1) $C_{12/14}$ coconut alcohol+5EO+4PO adduct
  C2) $C_{12/14}$ coconut alcohol+4EO+5PO adduct
PO=propylene oxide, EO=ethylene oxide.

II. Performance Testing of the Rinse Aids

The composition of the surfactant component of the rinse aid formulations tested is shown in Table 1. Mixtures M1 to M6 correspond to the invention while mixtures M7 to M10 are intended for comparison.

TABLE 1

Rinse aid/surfactant composition
(percentages = % by weight)

| M | B1 % | B2 % | A1 % | A2 % | C1 % | C2 % |
|---|---|---|---|---|---|---|
| M1 |  | 30 |  | 70 |  |  |
| M2 |  | 50 | 20 | 30 |  |  |
| M3 |  |  | 50 |  | 30 | 20 |
| M4 | 30 | 30 | 40 |  |  |  |
| M5 |  | 50 | 40 |  | 10 |  |
| M6 |  |  |  | 35 |  | 65 |

| M | B1 % | B2 % | A1 % | A2 % | C1 % | C2 % |
|---|---|---|---|---|---|---|
| M7 |  |  |  |  |  | 100 |
| M8 |  | 100 |  |  |  |  |
| M9 |  |  |  | 100 |  |  |
| M10 |  | 30 |  |  |  | 70 |

Legend: M = mixture a) Foaming Behavior of the Rinse Aid Formulations

The foam generated by the rinse aid was determined using a circulation-type pressure gauge. The rinse aid (3 ml) was introduced by hand into the clear rinse cycle at 50° C.
0 points=no foaming
1 point=slight foaming
2 points=average foaming (still acceptable)
3 points=heavy foaming b) Drying 15 Minutes after the end of the dishwashing program, the door of the dishwashing machine was fully opened. After 5 minutes, drying was evaluated by counting the number of residual drops on the items of tableware listed below. Evaluation:
0 points=more than 5 drops
1 point=5 drops
2 points=4 drops
3 points=3 drops
4 points=2 drops
5 points=1 drop
6 points=no drops (optimal drying)

c) Clear Rinse Effect

After the evaluation of drying, the items of tableware were left to cool for 30 minutes outside the dishwashing machine and then visually evaluated in an illuminated black box. The dried-on residual droplets, streaks, coatings, cloudy films etc. left on the dishes and crockery were evaluated. Evaluation:
0 points=poor clear rinse effect
8 points=optimal clear rinse effect d) The performance tests b) and c) were carried out with softened water in a Bauknecht GSF 1162 dishwasher (normal 65° C. program). 40 ml of Somat® detergent (Henkel) were introduced into the wash cycle. The rinse aid was used in a quantity of 3 ml and was introduced into the clear rinse cycle by hand at 50° C. The salt content of the water was between 600 and 700 mg/l. Three wash cycles were carried out with each rinse aid formulation. The following items of tableware were used to evaluate drying and the clear rinse effect:

6 "Neckar Becher" glasses (Schott-Zwiesel)
3 "Brasilia" stainless steel knives (WMF)
3 white china dinner plates (Arzberg)
3 red "Valon-Eβteller" plastic dinner plates (Haβmann).

Examples 1 to 6. Comparison Examples C1 to C4

TABLE 2

Rinse aid formulations
Percentages = % by weight
water to 100% by weight; CS = sodium cumene sulfonate,
DS = citric acid

| Ex. | M | c (Surfactant) | Cumene sulfonate % | Citric acid % | Appearance at 70° C. |
|---|---|---|---|---|---|
| 1 | M1 | 17.5 | 3.0 | 0.5 | Clear |
| 2 | M2 | 17.5 | 3.0 | 0.5 | Clear |
| 3 | M3 | 17.5 | 3.0 | 0.5 | Clear |
| 4 | M4 | 17.5 | 3.0 | 0.5 | Clear |
| 5 | M5 | 17.5 | 3.0 | 0.5 | Clear |
| 6 | M6 | 17.5 | 3.0 | 0.5 | Clear |
| C1 | M7 | 17.5 | 3.0 | 0.5 | Clear |
| C2 | M8 | 17.5 | 3.0 | 0.5 | Clear |

TABLE 2-continued

Rinse aid formulations
Percentages = % by weight
water to 100% by weight; CS = sodium cumene sulfonate,
DS = citric acid

| Ex. | M | c (Surfactant) | Cumene sulfonate % | Citric acid % | Appearance at 70° C. |
|---|---|---|---|---|---|
| C3 | M9 | 17.5 | 3.0 | 0.5 | Clear |
| C4 | M10 | 17.5 | 3.0 | 0.5 | Clear |

Examples 1 to 6. Comparison Examples C1 to C4

TABLE 3

Drying of the tableware/clear rinse effect

| | | Glasses | | Knives | | China | | Plastic | | |
|---|---|---|---|---|---|---|---|---|---|---|
| Ex. | M. | D | CRE | D | CRE | D | CRE | D | CRE | Foam score |
| 1 | M1 | 3.7 | 6.5 | 4.1 | 4.1 | 5.0 | 7.1 | 4.0 | 6.0 | 0 |
| 2 | M2 | 3.5 | 6.3 | 4.2 | 3.5 | 5.1 | 6.9 | 3.9 | 6.1 | 0 |
| 3 | M3 | 3.6 | 6.8 | 4.3 | 3.7 | 4.8 | 6.8 | 4.1 | 5.9 | 1 |
| 4 | M4 | 3.4 | 6.4 | 4.4 | 3.5 | 4.9 | 6.7 | 4.1 | 6.1 | 1 |
| 5 | M5 | 3.3 | 6.5 | 4.5 | 3.3 | 4.8 | 7.2 | 4.0 | 6.3 | 1 |
| 6 | M6 | 3.4 | 6.6 | 4.3 | 3.8 | 4.9 | 7.3 | 4.1 | 6.1 | 0 |
| C1 | M7 | 2.5 | 5.8 | 4.2 | 1.9 | 4.0 | 6.0 | 4.0 | 5.1 | 3 |
| C2 | M8 | 1.3 | 5.3 | 2.3 | 1.7 | 4.0 | 4.3 | 2.7 | 4.5 | 0 |
| C3 | M9 | 2.4 | 5.8 | 4.4 | 2.2 | 4.9 | 6.4 | 4.1 | 5.1 | 1 |
| C4 | M10 | 2.6 | 5.5 | 4.3 | 2.5 | 4.8 | 6.3 | 3.5 | 4.7 | 1 |

Legend: D = drying, CRE = clear rinse effect

It can be seen from Table 3 that the rinse aids according to the invention have a better clear rinse effect on all the surfaces tested than the Comparison Examples coupled with a very good to good foam score.

The invention claimed is:

1. A low-foaming cleaning composition comprising:
    (a) 0.5% to 20% by weight of a hydroxy mixed ether of the formula:

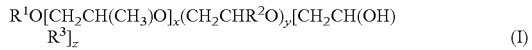
    $$R^1O[CH_2CH(CH_3)O]_x(CH_2CHR^2O)_y[CH_2CH(OH)R^3]_z \quad (I)$$

wherein $R^1$ is an alkyl and/or alkylene group containing from 4 to 18 carbon atoms, $R^2$ is hydrogen, $R^3$ is an alkyl group having from 2 to 22 carbon atoms, x is 0, y is a number from 1 to 30, and z is a number from 1 to 3; and
    (b) 0.5% to 20% by weight of a low-foaming nonionic surfactant selected from the group consisting of optionally end-capped fatty alcohol polyethylene glycol/polypropylene glycol ethers of the formula:

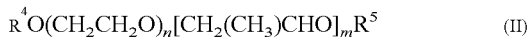
    $$R^4O(CH_2CH_2O)_n[CH_2(CH_3)CHO]_mR^5 \quad (II)$$

wherein $R^4$ is an alkyl and/or alkylene group containing from 8 to 22 carbon atoms, $R^5$ is hydrogen or an alkyl group containing from 1 to 8 carbon atoms, n is a number from 1 to 15 and m is a number up to 10, an optionally end-capped fatty alcohol polypropylene glycol/polyethylene glycol ethers of the formula:

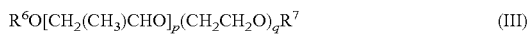
    $$R^6O[CH_2(CH_3)CHO]_p(CH_2CH_2O)_qR^7 \quad (III)$$

wherein $R^6$ is an alkyl and/or alkylene group having from 8 to 22 carbon atoms, $R^7$ is hydrogen or an alkyl group having from 1 to 8 carbon atoms, p is a number from 1 to 5, and q is a number up to 15, and mixtures thereof;
    c) up to 40% by weight of a solubilizer;
    d) 0.1% to 50% by weight of a carboxylic acid;
    e) 1% to 20% by weight of an alkali metal salt of a low molecular weight alkyl benzene sulfonic acid; and
    f) remainder, to 100% water, all weights based on the total weight of the cleaning composition.

2. The composition of claim 1 wherein in formula (I) $R^1$ is an alkyl group containing from 8 to 14 carbon atoms, $R^3$ is an alkyl group containing from 8 to 12 carbon atoms, y is a number from 10 to 25, and z is 1.

3. The composition of claim 1 wherein in formula (II) $R^4$ is an alkyl group containing from 8 to 16 carbon atoms, $R^5$ is hydrogen, n is a number from 1 to 5, and m is zero.

4. The composition of claim 1 wherein in formula (II) $R^4$ is an alkyl group containing from 8 to 16 carbon atoms, $R^5$ is hydrogen, n is a number from 2 to 7, and m is a number from 3 to 7.

5. The composition of claim 1 wherein in formula (II) $R^4$ is an alkyl group containing from 8 to 16 carbon atoms, $R^5$ is a methyl group, n is a number from 1 to 5, and m is zero.

6. The composition of claim 1 wherein in formula (II) $R^4$ is an alkyl group containing from 8 to 16 carbon atoms, $R^5$ is an alkyl group having from 4 to 8 carbon atoms, n is a number from 5 to 15, and m is zero.

7. The composition of claim 1 wherein in formula (III) $R^6$ is an alkyl group containing from 8 to 16 carbon atoms, $R^7$ is hydrogen, p is a number from 1 to 5, and q is number from 1 to 6.

8. The composition of claim 1 wherein (a) and (b) are present in the composition in a ratio by weight of from 10:90 to 80:20.

* * * * *